Dec. 11, 1923.

R. F. HALLIWELL

VALVE MECHANISM

Filed Nov. 17, 1921

1,477,346

Inventor:
Reginald F. Halliwell,
by Albert G. Davis
His Attorney.

Patented Dec. 11, 1923.

1,477,346

UNITED STATES PATENT OFFICE.

REGINALD F. HALLIWELL, OF LEAMINGTON, ENGLAND, ASSIGNOR TO GENERAL ELECTRIC COMPANY, A CORPORATION OF NEW YORK.

VALVE MECHANISM.

Application filed November 17, 1921. Serial No. 515,950.

*To all whom it may concern:*

Be it known that I, REGINALD FRANCIS HALLIWELL, a subject of the King of Great Britain, residing at Leamington, county of Warwickshire, England, have invented certain new and useful Improvements in Valve Mechanisms, of which the following is a specification.

The present invention relates to valve mechanisms and particularly that type of valve mechanism usually termed combined trip and throttle valves, and has for its object to provide an improved structure and arrangement in a valve mechanism of this type.

For a consideration of what I believe to be novel and my invention, attention is directed to the accompanying description and the claims appended thereto.

Figure 1:
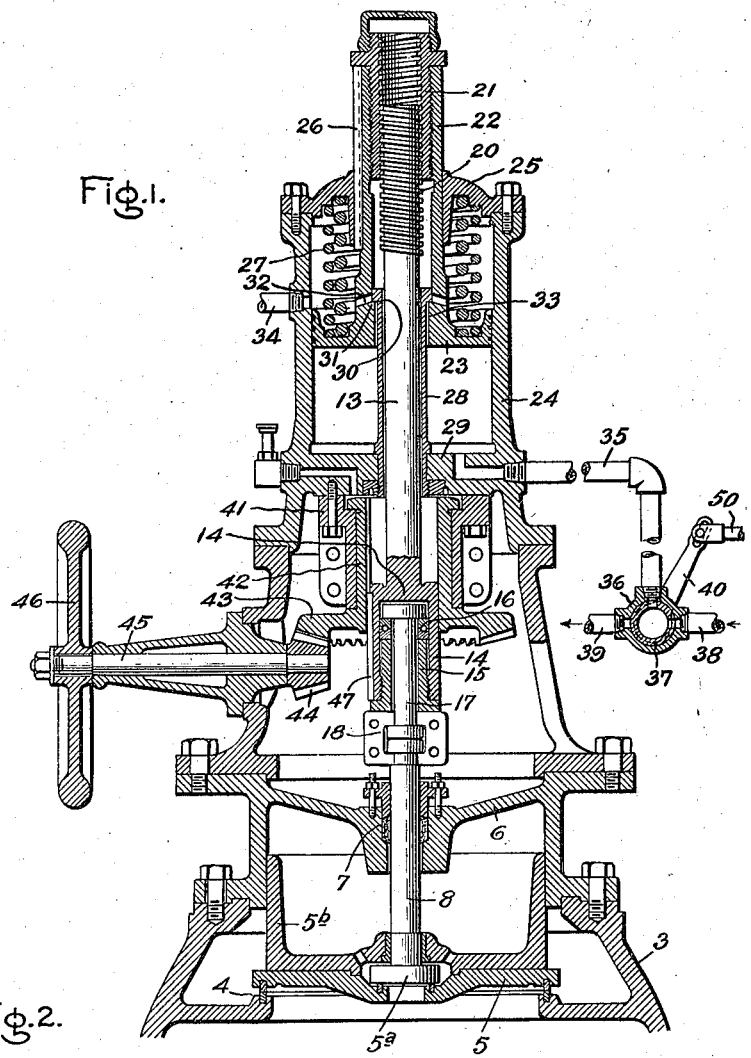
Figure 2:
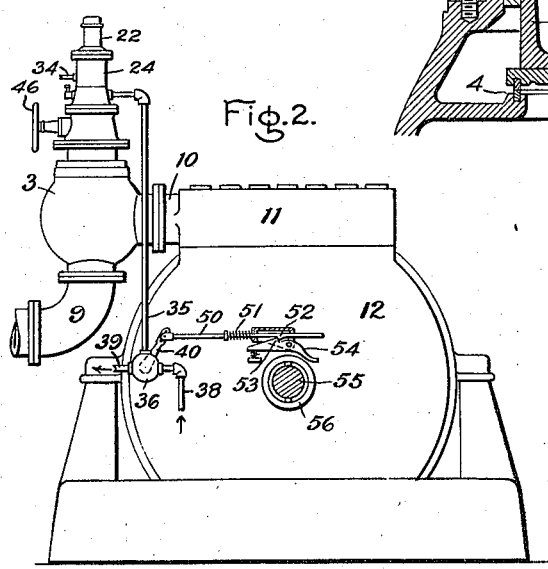

In the drawing, Fig. 1 is a sectional view of a valve mechanism embodying my invention, and Fig. 2 is a diagrammatic view illustrating the valve mechanism associated with an elastic-fluid turbine.

Referring to the drawing, 3 indicates a valve casing having a seat 4 upon which a valve 5 seats. Valve casing 3 has a head 6 provided with a stuffing box 7 through which valve spindle 8 passes. Valve 5 may be of any suitable or desired type which is opened and closed by axial movements of spindle 8, the particular type of valve forming no part of the present invention. In the present instance a known type of valve comprising a pilot valve 5ª and balancing piston 5ᵇ is illustrated. In Fig. 2, 9 indicates an admission conduit connected to valve casing 3 and 10 indicates a conduit connecting the discharge side of the valve to the fluid chest 11 of an elastic-fluid turbine 12.

Valve spindle 8 is connected to a valve stem 13 by a swivel connection which permits stem 13 to turn without turning spindle 8 and the valve. In the present instance this connection is formed by providing the lower end of stem 13 with a hollow head 14 into which threads a bushing 15. The inner or upper end of bushing 15 supports a ball bearing 16 on which hangs a link 17 connected at its lower end to spindle 8 as indicated at 18. Link 17 passes loosely through bushing 15 and it will be clear that while stem 13 will open and close the valve when moved axially, it may turn without turning spindle 8 and the valve.

The upper end of stem 13 is threaded as indicated at 20, the threads engaging with threads on the inner surface of a sleeve 21 fixed in a tubular rod 22 carried by a piston 23. Piston 23 slides in a cylinder 24, rod 22 passing out through the head 25 of such cylinder. The piston 23 and rod 22 are held from turning by a spline 26 arranged between the rod 22 and head 25. Located between piston 23 and cylinder head 25 are one or more springs 27 which act in a direction to force piston 23 toward the bottom of cylinder 24 and thus serve to bias valve 5 toward closed position. Stem 13 passes loosely through piston 23 and piston rod 22 and surrounding stem 13 is a sleeve 28 which at its lower end is fixed to the base 29 of cylinder 24 and at its upper end is provided with a shoulder 30 located just above and adapted to be engaged by a shoulder 31 in the bore of rod 22. In rod 22 are a number of openings 32 which form a conduit connecting the space below piston 23 with the space above it, and shoulders 30 and 31 form in substance a valve means for closing these openings or conduit when the parts are in the positions shown in Fig. 1. When piston 23 moves downward in the cylinder, shoulder 31 moves away from shoulder 30 whereby the space below piston 23 is connected to the space above it by way of a clearance space 33 and openings 32. At 34 is a waste pipe connected to cylinder 24 above the piston. Connected to cylinder 24 below the piston is a pressure pipe 35 which leads to a valve casing 36 in which is a threeway valve 37 which in one position connects pipe 35 to a pipe 38 leading from a suitable source of pressure and in another position cuts off connection with pipe 38 and connects pipe 35 to a discharge pipe 39. Connected to valve 37 is an operating arm 40 by means of which the valve may be moved manually or by suitable automatic means to connect pipe 35 to either pipe 38 or pipe 39.

Carried by cylinder base 29 is a frame 41 in which is rotatably mounted a sleeve 42 having a bevel gear 43 at its outer or lower end. Meshing with bevel gear 43 is a bevel pinion 44 carried by a shaft 45, on the outer end of which is a hand wheel 46. Head 14 slides in sleeve 42 and between the head and the sleeve is a spline 47 which connects the head to the sleeve so they must turn together but permits the sleeve to move axially relatively to the head. It will thus be seen that when hand wheel 46 is operated sleeve 42 and stem 13 will be turned and due to the engagement of threads 20 on the end of stem 13 with the threads in sleeve 21 stem 13 will be moved axially to open or close the valve depending upon in which direction hand wheel 46 is turned.

The operation is as follows:

With the parts in the positions shown in Fig. 1, fluid pressure enters cylinder 24 by way of pipe 38, valve 37 and pipe 35, maintaining pressure under piston 23 and holding it in the position shown against the action of springs 27. In this position of the parts shoulder 31 engages shoulder 30 so that communication between the under side of piston 23 and the upper side through openings 32 is shut off. Shoulder 30 acts as a stop to limit the upward movement of piston 23 and also serves to position piston rod 22 and the sleeve 21. The valve 5 may be now opened and closed manually by turning hand wheel 46 in one direction or the other. When hand wheel 46 is turned in one direction, pinion 44 will turn bevel gear 43 in a direction to cause threads 20 to ride up the threads in sleeve 21, thereby opening the valve, while when turned in the other direction stem 13 will be turned in a direction to cause threads 20 to ride down on the threads in sleeve 21 to close the valve. During these movements it will be clear that, due to spline 47, sleeve 42 and rod 13 turn together and the rod moves vertically relatively to the sleeve. The valve can thus be fully opened, closed, or set in any intermediate position by the hand wheel.

If at any time, it is desired to quickly close the valve independently of hand wheel 46, arm 40 is moved to operate valve 37 so as disconnect pipe 35 from pipe 38 and connect it to discharge pipe 39. This is effected by a 90° movement of arm 40 toward the left in Fig. 1. When valve 37 is turned to this position, the fluid pressure under piston 23 is relieved through pipe 35, valve 37 and discharge pipe 39 so that springs 27 may force piston 23 downward in the cylinder to close valve 5. During this movement it will be seen that rod 22 and sleeve 21 move along with piston 23, the valve being thus closed independently of the threaded connection between sleeve 21 and stem 13. As soon as piston 23 starts to move downward in cylinder 24, shoulder 31 moves away from shoulder 30 whereupon fluid from the under side of piston 23 may then escape through clearance space 33, openings 32 and discharge pipe 34. This provides additional area for the escape of fluid pressure from beneath piston 23 so as to accelerate the closing movement of the valve.

The primary and more important function of openings 32 and the valve means formed by shoulders 30 and 31 is to provide an arrangement whereby after valve 5 is closed by movement of piston 23, it cannot be again opened by moving control valve 37 back to its original position wherein fluid pressure pipe 38 is connected to pipe 35, i. e. by the restoration of the pressure under piston 23. Under these conditions fluid pressure admitted to the under side of piston 23 will escape through clearance spaces 33, openings 22 and discharge pipe 34, so no pressure will be built up under piston 23 to effect an opening of valve 5. In order to open the valve and again set the tripping mechanism, it is necessary to turn hand wheel 46 in a direction to close the valve. When this is done, since the valve is already on its seat, the threads in sleeve 21 will be forced to ride up the threads 20 on the upper end of stem 13, thereby raising the piston 23 in cylinder 24. This operation is continued until shoulder 31 again comes into engagement with shoulder 30 to close openings 32. Fluid pressure when admitted beneath piston 23 will build up a pressure to hold the piston in the position to which it has been moved by hand wheel 46 and hold sleeve 21 in its uppermost position. By turning hand wheel 46 in the opposition direction, the valve then can be opened as before described. It will thus be seen that after valve 5 has been closed by the relief of fluid pressure under piston 23, the piston must be reset manually before the valve can be opened again.

I preferably connect fluid pressure pipe 38 with the force feed lubricating system for the prime mover in connection with which the valve is used. This provides a suitable supply of fluid pressure and in addition has the advantage that in case the lubricating system for the prime mover fails, the emergency combined trip and throttle valve will be immediately closed. When this happens restoration of the fluid pressure of lubricating system will not again open the combined trip and throttle valve because the shoulder 31 will have moved away from shoulder 30. If the lubricating system fails therefore, it is necessary to reset the valve by hand before the prime mover can again be put into service. As will be appreciated this is a feature of considerable importance in connection with my invention as it is bound to bring to the attention of the operator that the pressure of the lubricating system has failed.

The operating arm 40 for valve 37 is shown in Fig. 2 as being connected with an emergency trip mechanism of turbine 12, such trip mechanism being shown diagrammatically and by way of example only. As shown, it comprises a rod 50 biased toward the left by the spring 51 and held against such biasing force by a hook 52 which engages with a hook 53 on a pivoted trip finger 54. The turbine shaft 55 is provided with an eccentrically disposed ring 56 which in case of excess speed moves outwardly striking the end of trip finger 54, thereby releasing rod 50 whereupon spring 51 pushes it toward the left to shift the position of valve 37. It will be understood that this is a known arrangement of emergency trip mechanism, its specific structure forming no part of the present invention, and is to be taken as typical of any suitable arrangement of this character.

In accordance with the provisions of the patent statutes, I have described the principle of operation of my invention, together with the apparatus which I now consider to represent the best embodiment thereof; but I desire to have it understood that the apparatus shown is only illustrative, and that the invention may be carried out by other means.

What I claim as new and desire to secure by Letters Patent of the United States, is,—

1. In a valve mechanism, the combination of a valve, a stem connected thereto, a fluid pressure supported piston member, a threaded connection between said stem and member whereby the valve may be opened manually, means for supplying fluid pressure to said member to hold it in fixed position, means for relieving the fluid pressure on said member to permit the valve to close independently of the threaded connection, and means forming a second discharge passage for relieving pressure on said member.

2. In a valve mechanism, the combination of a valve, a stem for the valve, a cylinder, a piston therein, a conduit for supplying fluid pressure to the cylinder to hold the piston in fixed position therein, a connection between the stem and piston whereby the valve may be opened and closed manually, a valve in said conduit for disconnecting the cylinder from the supply of fluid pressure and connecting it to a region of lower pressure, a second conduit connected to the cylinder, and valve means therein which is normally closed but is opened when the pressure under the piston is relieved, whereby restoration of the fluid pressure cannot effect opening of said valve.

3. In a valve mechanism, the combination of a valve, a stem for the valve, a cylinder, a piston in the cylinder, a threaded connection between the piston and stem through which the valve may be opened and closed manually, means biasing the piston toward one end of the cylinder, a conduit for supplying fluid pressure to the cylinder to hold the piston in fixed position toward the other end of the cylinder in opposition to said biasing means, valve means for relieving the pressure in the cylinder to permit the piston to move and actuate the valve, and means forming a discharge conduit for the cylinder which is opened when the piston moves from its fixed position.

4. In a valve mechanism, the combination of a valve casing, a valve therein, a cylinder mounted on the valve casing, a piston in the cylinder provided with an axial opening, said piston being biased toward one end of the cylinder, a stem for the valve which extends through said opening, means forming a threaded connection between the stem and piston whereby the valve may be opened and closed manually, a conduit for supplying fluid pressure to the cylinder to hold the piston in a fixed position against its biasing force, and means forming a discharge conduit for the cylinder which is closed by a part of the piston when held in fixed position.

5. The combination with an elastic-fluid prime mover having a pressure lubricating system, of a combined trip and throttle valve mechanism controlling the admission of elastic fluid to the prime mover, said valve mechanism comprising a valve having a stem, a movable member, a connection between the stem and movable member whereby the valve may be opened and closed manually, a conduit connected to said lubricating system for supplying fluid pressure to said movable member to hold it in a fixed, stationary position, an emergency governor for the turbine, a valve in said conduit controlled by the emergency governor, and means forming a discharge conduit for said movable member, said discharge conduit being closed when the movable member is in its fixed, stationary position.

In witness whereof, I have hereunto set my hand this 12th day of November, 1921.

REGINALD F. HALLIWELL.